Patented Apr. 10, 1923.

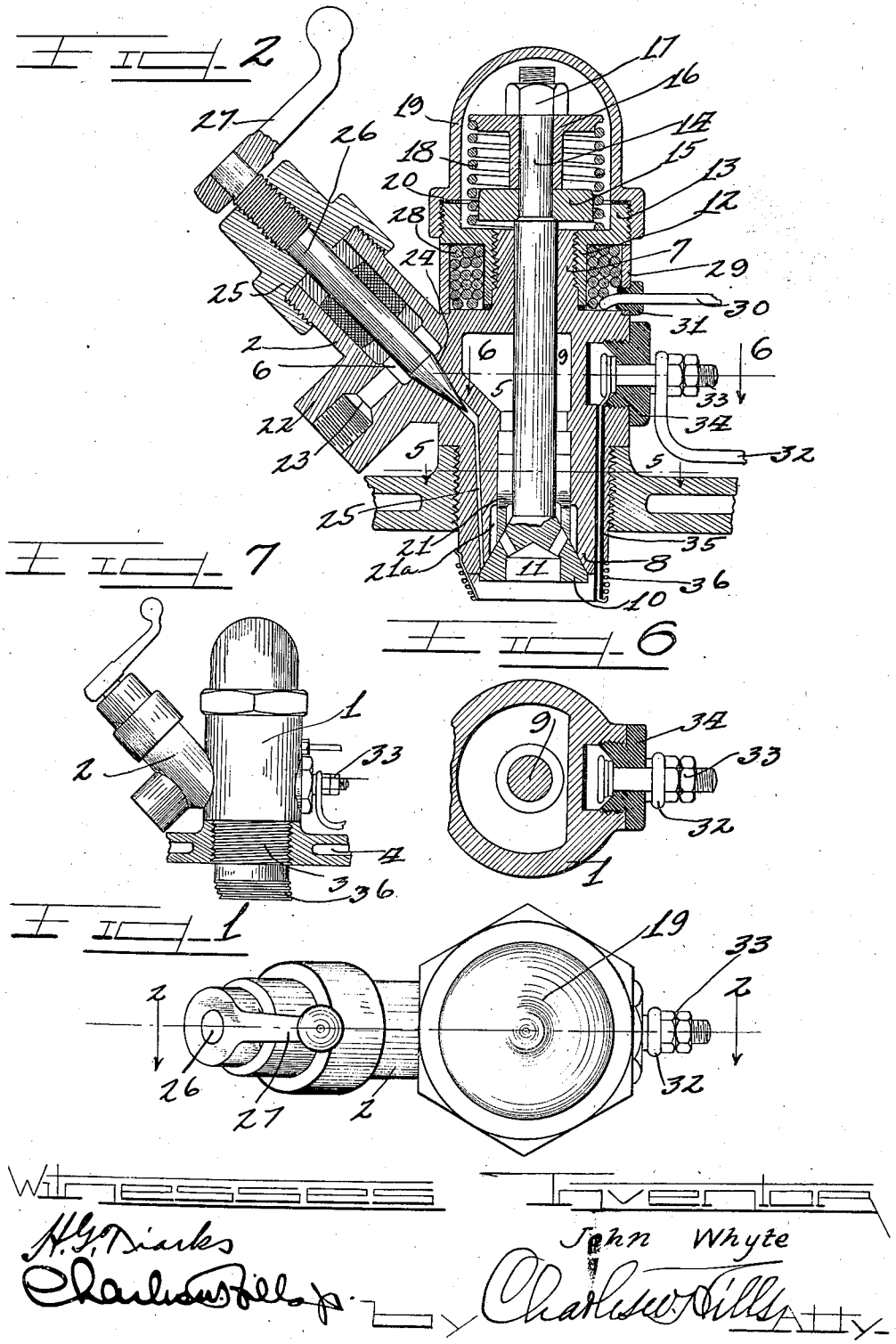

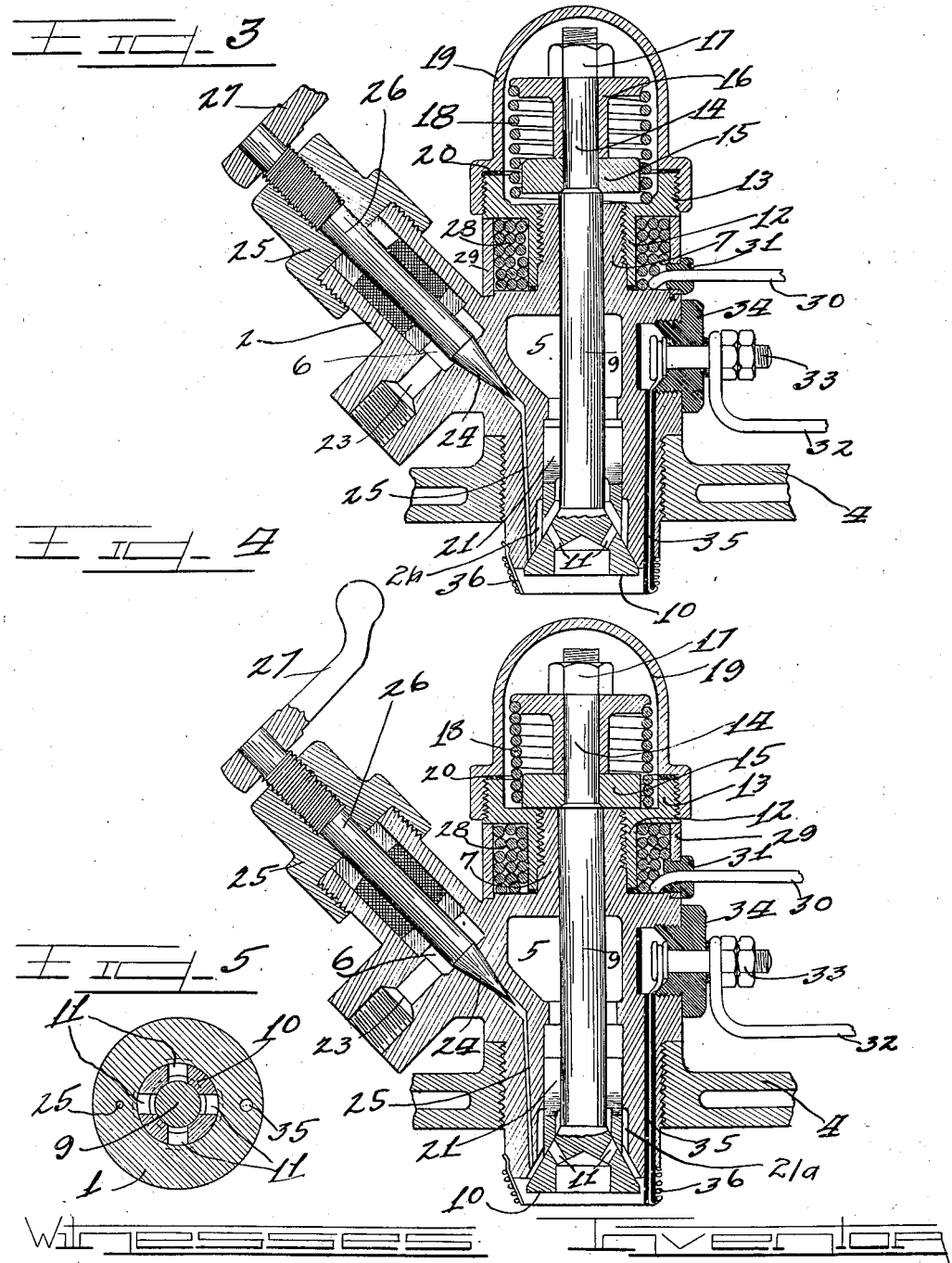

1,451,384

UNITED STATES PATENT OFFICE.

JOHN WHYTE, OF CHICAGO, ILLINOIS.

SOLENOID-CONTROLLED FUEL INJECTION AND IGNITION VALVE.

Application filed April 19, 1920. Serial No. 374,894.

*To all whom it may concern:*

Be it known that I, JOHN WHYTE, a citizen of the United States, and a resident of the city of Chicago, in the county of Cook and State of Illinois, have invented certain new and useful Improvements in a Solenoid-Controlled Fuel Injection and Ignition Valve; and I do hereby declare that the following is a full, clear, and exact description of the same, reference being had to the accompanying drawings, and to the numerals of reference marked thereon, which form a part of this specification.

This invention relates to a solenoid-controlled fuel injection and ignition valve. Heavy liquid fuels cannot be used with internal-combustion engines for the reason that their high specific gravity precludes the possibility of their being atomized by carburation. Systems heretofore used for adapting internal-combustion engines to burn these heavy liquid fuels have almost invariably included external compressing means to aid in injecting and atomizing the fuel. This process is expensive and complicated and is not readily adapted to existing types of internal-combustion engines.

It is an object of this invention to provide a solenoid-controlled valve and injector device whereby internal-combustion engines may be adapted to use liquid fuel of high specific gravity.

It is also an object of this invention to provide a fuel-injection system for internal-combustion engines which is operated by remotely controlled electrical means.

It is another object of this invention to provide a fuel-injection system for internal-combustion engines whereby ignition is assured by incandescent means associated with the injection means.

It is a further object of this invention to provide a fuel injection system whereby existing types of internal combustion engines may be adapted to use liquid fuel of high specific gravity.

It is an important object of this invention to provide a fuel-injection system for internal-combustion engines wherein the pressure of combustion in the engine cylinder is utilized as an atomizing and injection medium for the ingoing fuel.

Other and further important objects of this invention will be apparent from the disclosures in the drawings and specification.

The invention (in a preferred form) is illustrated in the drawings and hereinafter more fully described.

On the drawings:

Figure 1 is a top plan view of a fuel-injection device embodying the principles of this invention.

Figure 2 is a section on line 2—2 of Figure 1.

Figure 3 is a section similar to Figure 2 with the compression valve shown in open position.

Figure 4 is a section similar to Figure 2 with the fuel-injection valve shown in open position.

Figure 5 is a section on line 5—5 of Figure 2.

Figure 6 is a section on line 6—6 of Figure 2.

Figure 7 is a slightly reduced view in side elevation of a solenoid-controlled, fuel-injection valve embodying the principles of this invention.

As shown on the drawings:

The device embodying the principles of this invention comprises in general the valve casing 1, which is preferably formed from non-magnetic material and the casing 2, which is formed on the side thereof and integral therewith. Casing 1 is threaded at its lower portion 3 for insertion in the walls 4 of the combustion chamber of an internal-combustion engine. Said casings 1 and 2 are cored to form respectively the compression chamber 5 and the fuel chamber 6 therein. An apertured, externally-threaded boss 7 is formed integral with the casing 1 at the upper portion thereof, while the lower portion of said casing is beveled to form the valve seat 8 at the bottom of the chamber 5. Slidable in the aperture in the boss 7 and extending downwardly through the chamber 6 is a stem 9 and on the lower portion of said stem 9, the fuel injection valve 10 is formed preferably of non-magnetic metal. Said fuel injection valve 10 is provided with passages 11 therein communicating with the chamber 5.

The internally threaded solenoid casing 12, which is made from magnetic material, engages the threads of the boss 7 and is flared at its upper portion and provided with externally threaded vertical flanges 13. The stem 9 is reduced at its upper portion 14 and secured to said reduced portion adjacent the stem 9 is the solenoid follower or armature 15. A cylindrical spacer 16 having an outwardly extending flange at the upper portion thereof is engaged around the portion 14 above the solenoid follower 15. The reduced portion 14 is threaded above the portion 16 and a nut 17 serves to secure said cylindrical member 16 securely in position thereon. Surrounding the solenoid follower 15 and engaged between the flanged portion of the member 16 and the upper portion of the solenoid casing 12 is a coil spring 18, which acts normally to hold the fuel injection valve 10 closed against the seat 8. A housing 19 is provided for protecting the spring and solenoid follower. Said housing 19 engages the threads on the flanged portion 13 of the solenoid casing 12 and a tight fit between said housing and flanges 13 is assured by the gasket 20. Slidable freely in and communicating with the chamber 6 is the compression valve 21 normally adapted to close the passages 11 in the fuel injection valve 10. Passages 21ª in the lower interior portion of the casing 1 provide communication from the chamber 5 to the valve seat 8 and allow trapped gases to escape from said chamber when the valve 10 is open. A boss 22, integral with the casing 2, is provided with an internally-threaded chamber 23 communicating with the chamber 6 by means of which liquid fuel may be introduced into said chamber 6. The inner end of the chamber 6 is beveled to form a valve seat 24 and communication between said valve seat 24 and the valve seat 8 is provided by the passage 25 in the casing 1. The outer portion of the casing 2 is threaded and an apertured internally threaded packing nut 25 engaged thereon. The outer portion of the aperture in the nut 25 is threaded and the fuel-control valve 26 adapted to seat at 24 engaged therein. For operating the fuel control valve 26 a lever 27 is non-rotatably secured to the outer end thereof. The solenoid winding 28, which consists of a continuous insulated electrical conductor, is engaged around the solenoid casing 12 inside the casing 29, the inner end thereof being grounded and the outer lead wire 30 thereof being insulated from said casing 29 by the insulator 31. Said out-going lead wire 30 leads to a distributor of the type ordinarily used in internal-combustion engines. The distributor is connected with a storage battery or other source of electrical energy in the usual manner. From the said battery a lead 32 extends to the terminal 33, which is insulated from the casing 1 by the insulator 34. An insulated lead 35 leads through the casing 1 to the glower coil 36, which is formed from high resistance metal wire at the inner end of the casing.

The glower coil 36 is insulated from the casing 1 and the inner end thereof is grounded thereto. The frame of the engine or ground is of course connected to the other terminal of the electrical energy source.

The operation is as follows:

The device of this invention is intended to be used in conjunction with any internal-combustion burning liquid fuel. When applied to an internal-combustion engine the device works in conjunction with an electrical distributor of the generally recognized type and a storage battery and generator or other source of electrical energy. As clearly shown in Figures 2, 3, 4 and 7, the device of this invention is attached to an internal combustion engine by threading the lower portion on the casing 1 into a threaded aperture provided in the casing 4 of the combustion chamber of said engine. On the suction stroke of the piston of the internal combustion engine to which the device of the invention is applied, air is drawn into the cylinder of said engine through the intake valve thereof. In engines using this device, the intake valve of the internal-combustion engine is preferably, although not necessarily, of the atmospheric type. On the compression stroke of the piston in the cylinder the charge of air previously drawn in is compressed and due to its compression the compression valve 21 is lifted from its seat and the compressed air is admitted into the chamber 5 through the passages 11 in the fuel-injection valve 10. At the proper point for ignition the solenoid circuit is closed by the battery distributor and the solenoid winding 28 is energized attracting the solenoid follower or armature 15 and the fuel injection valve 10 against the action of the spring 18. Liquid fuel is introduced from the chamber 6 through the open fuel-control valve 26 and the passage 25 to the seat 8 of the fuel injection valve 10. The fuel control valve 26 is opened manually to the desired amount by shifting the lever 27, and if desired a properly linked throttle rod may be used for operating said lever 27. On opening of the fuel-injection valve 10 the compressed air or gas from the chamber 5 escapes past the seat 8 of said valve through the passages 21ª and injects the liquid fuel from the passage 25 partially atomized through the glower coil 36, which is maintained at incandescence by electric current supplied through the terminal 33. This constitutes the starting cycle.

Combustion of fuel in the combustion chamber will cause a considerable rise in pressure and this in turn will cause the compression valve 21 to open and admit to the chamber 5, gases, having a pressure approximately equal to that of the maximum pressure of combustion. As the internal combustion engine continues running the cycle is repeated as heretofore described except instead of having only the compression pressure to atomize and inject the fuel the high pressure gas of combustion which has been trapped within the chamber 5 will be the injecting and atomizing medium.

After the engine is started the electric circuit to the glower coil 36 may be disconnected as the heat of combustion is sufficient to keep the filament in an incandescent condition. The injection valve of this invention provides a simple means for the combustion of liquid fuel of any grade within an internal-combustion motor and is particularly adapted for fuels which, by reason of their high specific gravity, cannot be atomized by carburation. Although solenoid control is indicated in this particular instance, it is not purposed to limit this invention thereto, since mechanical means for operating the fuel injection valve may be used where desired.

I am aware that numerous details of construction may be varied through a wide range without departing from the principles of this invention, and I therefore do not purpose limiting the patent granted otherwise than necessitated by the prior art.

I claim as my invention:

1. In a valve for internal combustion engines, a valve seat, a fuel duct leading to said valve seat, a valve co-operating with said valve seat to stop the flow of fuel from said duct, a chamber on the same side of said valve as said duct, passages through said valve leading to said chamber, and a one-way valve controlling said passages.

2. In a valve for internal combustion engines, a valve seat, a fuel duct leading to said valve seat, a fuel injection valve co-operating with said valve seat to stop the flow of fuel from said duct, a compression chamber on the same side of said valve as said duct, passages through said valve leading to said chamber, and a one-way pressure actuated valve controlling said passages but not obstructing the passage from said chamber to said valve seat.

3. A conical valve, a conical valve seat co-operating therewith, a circular series of passages through said valve, an annular valve closing the ends of said passages in the conical face of said first named valve, and a valve stem through the central part of said annular valve for actuating said conical valve.

4. A conical valve, a conical valve seat co-operating therewith, a circular series of passages through said valve, an annular valve closing the ends of said passages in the conical face of said first named valve, a valve stem through the central part of said annular valve for actuating said conical valve, a hollow cylindrical guide for said annular valve, passages in the wall of said guide, slots in said annular valve in line with said passages and overlapping them in certain positions of said annular valve, and a chamber above said valves whereby whenever the conical valve is open the chamber is in communication with the lower side of said conical valve.

5. A cylindrical housing, threads on the outside of said housing adapted to co-operate with the usual threaded opening in the cylinder of a standard internal combustion engine, a valve seat on the inner end of said housing, a passage leading to said valve seat, a valve co-operating with said valve seat, passages through said valve, a pressure valve controlling said passages, and a chamber within said housing to which said passages lead.

6. In a valve for internal combustion engines, a conical valve seat, a fuel duct leading to said valve seat, a conical valve co-operating with said valve seat to stop the flow of said fuel from said duct, a chamber on the side of said valve away from the base of the cone, a valve stem integral with said valve and extending through said chamber, electromagnetic means acting through said stem to open said valve, a spring acting through said stem to close said valve whenever said electromagnetic means is inactive, passages through said valve leading to said chamber, and a one-way valve controlling said passages.

7. In a valve for internal combustion engines, a valve seat, a fuel duct leading to said valve seat, a fuel injection valve cooperating with said valve seat to stop the flow of fuel from said duct, a compression chamber on the same side of said valve as said duct, passages through said valve leading to said chamber, a one-way pressure actuated valve in the shape of a cylindrical sleeve controlling said passages, a cylindrical conduit extending from said valve seat to said chamber and affording a guide for said sleeve, said cylindrical sleeve having passages therethrough extending from the upper edge of the sleeve part way to the lower edge and extensions of said passages, said extensions reaching part way only through said sleeve and leading from said passages along the inner face of said sleeve to the lower edge thereof and said conduit having grooves extending from the valve seat to a point above the lower ends of said passages in the lower position of said sleeve but below said ends in the higher position of said sleeve.

8. In a valve for internal combustion engines, a valve seat, a fuel duct leading to said valve seat, a fuel injection valve co-operating with said valve seat to stop the flow of fuel from said duct, a compression chamber on the same side of said valve as said duct, passages through said valve leading to said chamber, a one-way pressure actuated valve controlling said passages, and a connection between said valve seat and said chamber controlled by the position of said pressure actuated valve and meeting said valve seat near to and on the chamber side of the mouth of said fuel duct.

In testimony whereof I have hereunto subscribed my name in the presence of two subscribing witnesses.

JOHN WHYTE.

Witnesses:
RIDSDALE ELLIS,
CARLTON HILL.